UNITED STATES PATENT OFFICE.

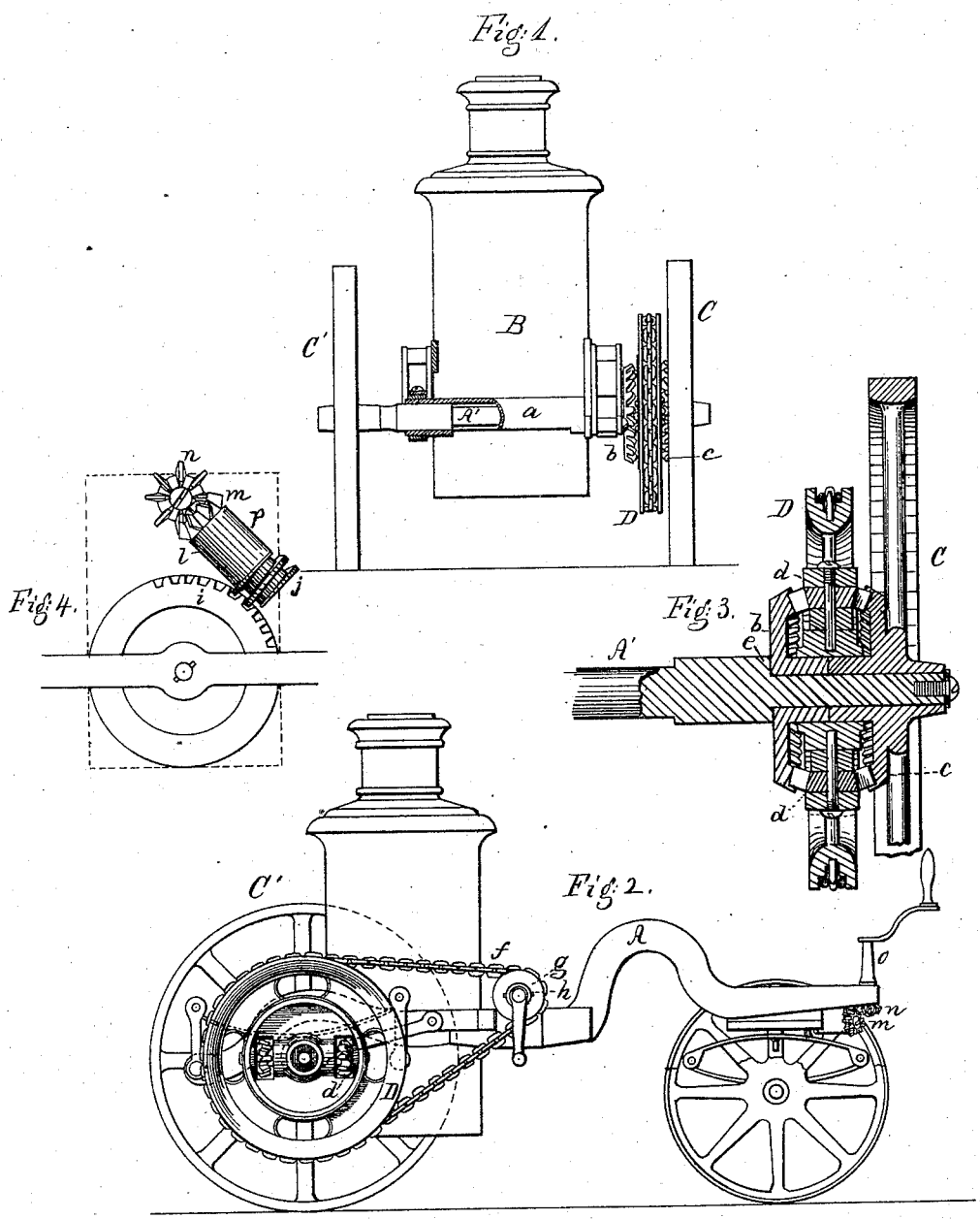

NEHEMIAH S. BEAN, OF MANCHESTER, NEW HAMPSHIRE.

IMPROVEMENT IN SELF-PROPELLING ENGINES.

Specification forming part of Letters Patent No. 157,904, dated December 22, 1874; application filed November 7, 1874.

*To all whom it may concern:*

Be it known that I, NEHEMIAH S. BEAN, of Manchester, county of Hillsborough and State of New Hampshire, have invented certain Improvements in Self-Propelling Engines, of which the following is a specification:

Letters Patent were issued to me, No. 75,348, March 10, 1868, for self-propelling engine, in which the hind wheels, loose on the axle, were driven through the agency of a chain or chains and sprocket-wheels; and this present invention relates to mechanism for driving fire-engines or other land-carriages, and consists in the application to the axle and one hind wheel of the carriage of bevel-wheels adapted to be engaged by pinions on a driving-wheel, all substantially as hereinafter described, so that, when desired, the wheels may be driven at different velocities, as, for instance, when the vehicle is moving on a curve or is being turned.

Figure 1 represents a back view of a steam fire-engine provided with my invention; Fig. 2, a side view with one of the wheels removed, showing the driving-wheel and its bevel-pinions. Fig. 3 is a longitudinal section through the wheel, bevel-wheels, driving-wheel, and axle, the wheel proper being broken away on its under side; and Fig. 4 is an under-side view of the devices for changing the direction of movement of the carriage, such devices being located on the front of the carriage.

A represents the frame-work for supporting the boiler and engine, and it may be of any approved or suitable shape; and B represents the boiler. A' represents the axle for the hind wheels, and it is supported in a long bearing-sleeve, *a*. The wheel C' is fixed to the axle A', and so, also, is the bevel-wheel *b*, the latter abutting against a collar turned thereon. The wheel C has on its inner face a bevel-wheel, *c*, facing the bevel-wheel *b*. The wheel C is free to turn on the axle A', and its sleeve or box and that of the wheel *b* abut, forming a collar or bearing and space for the driving-wheel D. This driving-wheel D is loose, and may turn freely on its bearing, and it has two loose bevel-pinions, *d d*, supported on pins passing through the driving-wheel; and it has also sprockets or teeth of suitable construction, to be engaged by a chain or belt, *f*, driven from the sprocket-wheel *g* of the cross-shaft *h*, which is rotated through suitable connections with the steam-engine supported on the carriage. Friction-surfaces might be used instead of sprocket-wheels. The small loosely-held bevel-pinions *d d* of the driving-wheel D each engage the two bevel-wheels *b c*, the former fast to the axle, and the latter to the wheel D, but loose on the axle, and as the driving-wheel is rotated the axle and the two wheels C and C' are rotated, driving or propelling the engine or carriage over the road. As long as the resistance offered the peripheries of the wheels C and C' is about even the bevel-pinions *d d* do not turn on their supporting-pins as the driving-wheel is turned; but should the resistance on one wheel be greater than on the other, then the bevel-pinions *d d* rotate, and in so doing give to the wheel not retarded a more rapid motion. This is specially necessary in connection with fire-engines, which are usually run at considerable speed, and when turning corners or running on curves; and with this invention the drag on the wheel on the shorter curve acts to increase the speed of the wheel on the outer or longer curve, and consequently reduces the drag and friction of that wheel, and enables it to run fast enough to prevent any dragging action.

This invention is applicable for propelling any land-carriage.

To a cross-bar or other suitable bar over the forward axle of the carriage I attach a toothed wheel, *i*, which is engaged by a worm-wheel, *j*, on a short shaft supported in a bearing, *p*, on the front part of the frame A. This short shaft is also provided with a bevel-pinion, *m*, and it is moved to move the toothed wheel *i*, and to control the direction of the motion of the carriage, through a shaft, *o*, having a bevel-pinion, *n*, and operated by the handle, under control of the driver or other person.

I claim—

1. The combination, with the axle of a carriage having a fixed bevel-wheel, of the loose wheel having an attached bevel-wheel, and the loose driving-wheel having loose pinions, to operate substantially as described.

2. The combination, with the frame and cross-bar, of the toothed wheel $i$, worm-gear $j$, its shaft and bevel-pinion $m$, and shaft $o$ and pinion $n$, for controlling the movement of the carriage, as and for the purpose set forth.

NEHEMIAH S. BEAN.

Witnesses:
L. B. CLOUGH,
G. C. COX.